US006452967B1

(12) United States Patent
Druilhe (10) Patent No.: US 6,452,967 B1
(45) Date of Patent: Sep. 17, 2002

(54) METHOD AND DEVICE FOR REDUCING COUPLING EFFECTS BETWEEN NEIGHBORING TELEPHONE DEVICES

(75) Inventor: François Druilhe, Le Versoud (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/251,839

(22) Filed: Feb. 17, 1999

(30) Foreign Application Priority Data

Feb. 17, 1998 (FR) .............................. 98 01913

(51) Int. Cl.[7] .......................... H03H 7/30; H03H 7/40; H03K 5/159
(52) U.S. Cl. ....................... 375/232; 708/323; 370/201; 370/291; 379/3; 379/406.8
(58) Field of Search ................................. 375/232, 233, 375/229; 708/322, 323; 370/290, 291, 201, 286; 379/406.08, 406.09, 406.1, 3

(56) References Cited

U.S. PATENT DOCUMENTS 5,181,198 A * 1/1993 Lechleider .................. 370/286
6,160,790 A * 12/2000 Bremer ....................... 370/201

FOREIGN PATENT DOCUMENTS

EP 528738 2/1993

OTHER PUBLICATIONS

Sallaerts, D. et al., "Single Chip U Interface Circuit and Its Field Application", Electrical Communication, vol. 64, No. 1, Jul. 1990, pp. 95–100.

Sugimoto, S. et al, "Design of 2B1Q Transceiver for ISDN Subscriber Loops", IEEE International Conference on Communications (ICC '89), vol. 1, Jun. 11–14, 1989, pp. 228–232.

French Search Report with Annex (Dec. 18, 1998).

* cited by examiner

Primary Examiner—Phuong Phu
(74) Attorney, Agent, or Firm—Lisa K. Jorgenson; Stephen Bongini; Fleit, Kain, Gibbons, Gutman & Bongini P.L.

(57) ABSTRACT

A method for reducing disturbing effects of coupling between a first transmission/reception device and a second transmission/reception device that are each connected to a subscriber line. According to the method, a signal received on a reception path of the first device is delayed by a delay equal to p times the transmission period. A coupling signal relating to a transmission path of a second device and the reception path of the first device is estimated based on a signal transmitted over the transmission path of the second device, and the delayed signal is ridded of the estimated coupling signal. Additionally, a device for transmitting/receiving a signal is provided. The device includes a memory coupled to a reception path for temporarily storing p symbols, a subtraction circuit, and a coupling estimation block. The coupling estimation block includes an adaptive filter with n (n>p) coupling coefficients and an estimation circuit that receives an ancillary transmission signal of another transmission/reception device. The estimation circuit and adaptive filter successively determine the n coupling coefficients as a function of the ancillary transmission signal and sum the coupling coefficients successively so as to deliver a coupling signal that is representative of estimated coupling between the reception path and the transmission path of the other device. The subtraction circuit receives an output of the memory and an output of the coupling estimation block.

26 Claims, 6 Drawing Sheets

METHOD AND DEVICE FOR REDUCING COUPLING EFFECTS BETWEEN NEIGHBORING TELEPHONE DEVICES

CROSS-REFERENCE TO RELATED APPLICATIONS

This application is based upon and claims priority from prior French Patent Application No. 98-01913, filed Feb. 17, 1998, the entire disclosure of which is herein incorporated by reference.

BACKGROUND OF THE INVENTION

1. Field of the Invention

The present invention relates to telephony, and more specifically to a method and device for reducing coupling between neighboring interface circuits connected to different subscriber lines that convey digital information in analog form.

2. Description of Related Art

Conventionally, baseband transcoding includes two steps: a coding step in which a predetermined symbol is associated with a sequence of successive digital information items, and a shaping step in which an elementary analog pulse of predetermined duration is associated with each symbol after digital-to-analog conversion. The resulting pulses form an analog signal that is delivered to the line transformer arranged at the end of the subscriber line. Among the codes typically used is a first type known by the name "2B1Q" and defined in the standards ETSI ETR 080 (European standard) and ANSI T1.601 (American standard), and another type known by the name "4B3T" and defined in the standards ETSI ETR 080 (European standard) and FTZ 1 TR 220 (German standard).

One conventional application of such baseband transcoding is to the transmission of digital information within the context of a digital network of universal character, such as the integrated services digital network (ISDN) defined in the standards ETSI ETR 080 (European standard) and ANSI T1.601 (American standard). The three main characteristics of ISDN are: (1) the capability of simultaneously employing telephone, telematic, and even video-communication services from one access; (2) subscriber-to-subscriber integral digital transmission with digital connections in the various switching centers; and (3) signaling in message mode only between the various functional entities (e.g., terminals, switches, and servers).

The architecture of the local network attaching users to an ISDN network includes: on the subscriber side, a network digital terminal (TNR) to which the various user terminals are attached, and on the switch side, a line terminal (TL) that provides substantially the same functions as the TNR terminal. Between the TNR terminal and the TL terminal there is a subscriber line (U interface) that consists of a pair of copper cables whose characteristics (e.g., maximum length, useful bit rate, and error rate) are standardized. The useful bit rate with ISDN is 144 Kbits/s, which is used by two "B" channels operating at 64 Kbits/s for transporting useful information and a "D" channel operating at 16 Kbits/s for transporting check bits. Thus, the subscriber line alone provides the so-called "narrow band" ISDN connection that allows access at the basic bit rate (2B+D) of 144 Kbits/s. By using codes such as the 4B3T code or the 2B1Q code, it becomes possible to reduce the spectral band used for transmission.

The U interface circuit is a transmitter/receiver circuit that is located at the TNR terminal and also at the TL terminal. The U interface allows bi-directional transmission of digital data over a single telephone pair, with transmission being carried out in "full-duplex" mode (i.e., the data transmitted and the data to be received are simultaneously on the telephone line). On reception, the data must be decoupled by echo cancellation circuitry that subtracts the signal that has just been transmitted from the received signal. Currently, it is possible to use a single mother card having up to sixteen identical U interface circuits associated with sixteen line transformers in a TL line terminal. However, if the line transformers are too close together, nuisance couplings between U interface circuits occur when a transmitter of one U interface circuit is transmitting while a receiver of another U interface circuit is receiving. As a consequence, disturbances are caused in the received signal on the reception path of a U interface circuit by the transmission paths of the immediately adjacent U interface circuits. This problem can be solved by physically distancing the transformers from one another, but this limits the number of subscriber lines that can be processed at a line terminal.

Further, new technology has recently allowed novel U interface circuits that can incorporate up to four identical transmission paths. However, in such circuits, nuisance coupling between paths is caused by the presence of a common supply as well as of other common elements. The coupling can be limited by designing such U interface circuits with separate power supplies and a minimum number of (or even zero) common circuits. However, such a solution increases the area of the U interface circuits.

SUMMARY OF THE INVENTION

In view of these drawbacks, it is an object of the present invention to remove the above-mentioned drawbacks and to provide a new solution that reduces disturbing effects of coupling between neighboring transmission/reception devices that are connected to two subscriber lines. The effect of coupling between two neighboring U interface circuits is estimated, and the estimated coupling signal is removed from the signal received by a U interface circuit.

One embodiment of the present invention provides a method for reducing disturbing effects of coupling between a first transmission/reception device and a second transmission/reception device that are each connected to a subscriber line that conveys streams of symbols in a temporally synchronous manner. According to the method, a signal received on a reception path of the first device is delayed by a delay equal to p times the transmission period. A coupling signal relating to a transmission path of a second device and the reception path of the first device is estimated based on a signal transmitted over the transmission path of the second device, and the delayed signal is ridded of the estimated coupling signal. In one preferred method, the coupling signal is estimated based on successive sums of n coefficients of a coupling estimation adaptive filter that are determined based on the signal transmitted over the transmission path of the second device.

Another embodiment of the present invention provides a device for transmitting/receiving a signal. The device includes a transmission path for transmitting a transmission signal, a reception path for receiving a reception signal, and a memory coupled to the reception path for temporarily storing p symbols. Additionally, a coupling estimation block is provided that includes an adaptive filter with n (n>p) coupling coefficients and an estimation circuit that receives an ancillary transmission signal of another transmission/reception device. The estimation circuit and adaptive filter successively determine the n coupling coefficients as a function of the ancillary transmission signal and sum the coupling coefficients successively so as to deliver a coupling signal that is representative of estimated coupling between the reception path and the transmission path of the other device. A first subtraction circuit receives an output of the memory and an output of the coupling estimation block. In a preferred embodiment, the device also includes an echo estimation block having a finite impulse response adaptive filter that receives the transmission signal and an error signal derived from the reception path, and a second subtraction circuit that receives an output of the memory and an output of the echo estimation block.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

In general, in preferred embodiments of the present invention, a coupling signal relating to the transmission path of a second transmission/reception device and the reception path of a first transmission/reception device is estimated on the basis of successive sums of n coupling coefficients of a coupling estimation adaptive filter. The digital signal received on the reception path of the first device is delayed by an amount equal to p times the transmission period of the symbols, and the delayed signal is ridded of the estimated coupling signal.

The n coupling coefficients are determined on the basis of the signal transmitted over the transmission path of the second device, and the number n itself is chosen so that it is greater than or equal to p and less than or equal to an eighth of the number of coefficients of the echo estimation filter. It has been experimentally shown that if n is less than p, there is not a correct estimation of the coupling signal between the two neighboring U interface circuits. Further, if n is greater than an eighth of the number of coefficients of the echo estimation filter, noise disturbances greater than those caused by the coupling between neighboring U interfaces can be added to the received signal.

Generally, the echo can be estimated on the basis of either a single finite impulse response filter (e.g., having 96 coefficients) or with a combination of a finite impulse response filter (e.g., having 64 coefficients) and an infinite impulse response filter (e.g., with two coefficients) that approximates the final part of the impulse response of the disturbance as a decreasing exponential. Moreover, the size of a FIFO (first-in, first-out) memory that is placed on the reception path of the U interface circuit to delay the signal is preferably equal to four symbols. It has then been found that with n equal to eight it is possible to obtain a good estimate of the coupling between two neighboring U interface circuits.

Moreover, estimation of the coupling signal on the basis of the successive sums of n coupling coefficients that are themselves determined on the basis of the successive values of n symbols transmitted by the disturbing channel is akin to a convolution between the coupling coefficients and the disturbing signal (differing, however, with a conventional convolution product involving the elementary products of the coefficients with the values of the samples of the disturbing signal). Thus it is possible to correctly estimate the coupling signal even when the disturbances do not vary linearly with the amplitude of the various symbols transmitted over the disturbing channel. In this respect, although within the meaning of signal processing theory, the present invention does not technically provide actual "filtering" for estimating the coupling because there is no multiplication by the disturbing signal. In spite of this, for simplification, the expression "coupling estimation filter" is used in this description to designate the circuitry that allows estimation of the coupling.

Additionally, the coefficients of the coupling estimation filter are updated on the basis of an error signal and a signal that is temporally delayed, with respect to the signal transmitted over the transmission path of the second device, by a delay having a predefined value that is chosen so as to ensure the convergence of the estimation of the coupling signal. In particular, the value chosen for the delay depends on the various filters placed between the subtraction of the coupling signal and the computing of the error signal in the reception path. Such delay, which is typically a multiple of the transmission period of the symbols, can be defined substantially a priori with regard to the structure of the reception path, and the value of the delay can be refined by simulation to ensure convergence of the estimation (i.e., to allow a substantially zero value to be obtained for the error signal).

In one embodiment of the method of the present invention, for a continuous stream of symbols transmitted over the transmission path of the second device, the estimation of the coupling signal by adaptive filtering is performed using the following process. For each symbol transmitted, a coupling coefficient is determined by choosing, as a function of the value of the symbol transmitted, one of the coupling coefficients of a coupling group associated with this symbol and composed of S coupling coefficients associated with the S possible values of the transmission symbols, and the coupling signal is estimated by successive sums of n coupling coefficients respectively associated with n consecutive symbols of the stream and chosen from among n coupling groups. Moreover, the updating of the coupling coefficients includes the updating of the coupling group associated with the symbol of rank i by updating the value of the coupling coefficient of such group associated with the value of the symbol of rank i-k on the basis of the previous value of the symbol of rank i-k and of the value of the error signal, k being a predefined value chosen so as to ensure the convergence of the estimation of the coupling signal.

In the absence of a symbol transmitted over the transmission path of the second device (i.e., the disturbing channel), a specific symbol representative of an absence of a transmitted symbol is computed and a zero coupling coefficient is assigned to this specific symbol. Thus, for a discontinuous stream of symbols transmitted by the second device, the coupling signal is estimated by successive sums of n coupling coefficients that include the coupling coefficients associated with the symbols of the stream and chosen from among the corresponding coupling groups, and the zero coupling coefficients corresponding to the absences of transmission.

Preferably, updating of the n coupling groups is then refrained from with each presence of a specific symbol and for a duration equal to n times the transmission period of the symbols. In other words, if the estimation processing operation is performed within n successive processing stages, the updating of the coupling groups is refrained from with each presence of a specific symbol at the input of the first stage and for as long as this specific symbol has not been propagated fully through the stages up to the output of the last stage. During this time, zero values are summed for the estimation of the coupling signal. Such processing is repeated during any period of absence of transmission over the disturbing channel.

According to an embodiment of the present invention, the coupling signal is estimated by calculating, at the transmission frequency of the symbols, coupling signal samples by n successive elementary processing operations performed in tempo with the transmission frequency of the symbols. In each such elementary processing operation, there is received a symbol of the stream of symbols transmitted via the transmission path of the neighboring device or a specific symbol (i.e., the symbol received by this elementary processing stage originating either directly from the disturbing channel if this is the first elementary processing operation, or from the previous elementary processing operation), a symbol temporally delayed with respect to the symbol or to the specific symbol, and a sampled value of the error signal. The coupling coefficient associated with the symbol or with the specific symbol received is determined, in that it is summed with the result of the counterpart summation performed at the previous processing operation (previous stage), and when the updating of the coupling coefficients is permitted, the coefficient associated with the delayed received symbol is updated by summing the previous value of this coupling coefficient with the sampled value of the error signal.

Thus, in such embodiments of the present invention and unlike with conventional adaptation of the coupling coefficients by a "least squares" algorithm, account is not taken of the square of the value of each disturbing symbol in order to modulate the sampled value of the error signal. It has been experimentally shown, especially because the coupling disturbances generated by the disturbing channel were second order, that ignoring this modulating factor (i.e., straightforward summation of the sampled value of the error signal) makes it possible to simplify the practical embodiment of the method of the present invention while at the same time allowing good estimation of the coupling signal.

The site in the reception path for subtracting the coupling signal can vary in embodiments of the present invention. Thus, the delayed signal emanating from the FIFO memory can be ridded of the echo signal before ridding of the coupling signal. However, it is preferable to first rid the delayed signal of the coupling signal and then to rid the resulting signal of the estimated echo signal. In particular, this subtraction order allows construction of an independent coupling estimation component that can be easily connected to a conventional U interface card that is already equipped with an echo estimation block.

Another embodiment of the present invention provides a device for transmitting and receiving transmission and reception signals, which include streams of digital symbols chosen from among S possible transmission symbols, over a transmission path and reception path that are connected to a subscriber telephone line. The device includes a memory located on the reception path that can temporarily store p symbols, an echo estimation block connected between the transmission and reception path and having a finite impulse response adaptive filter receiving the transmission signal and an error signal computed on the reception path, and a first subtraction circuit that receives the output of the memory and the output of the echo estimation block.

Additionally, a coupling estimation block is provided that includes adaptive filtering circuitry, delay circuitry, and updating circuitry. The adaptive filtering circuitry has n coupling coefficients, and n is greater than or equal to p and less than or equal to an eighth of the number of coefficients of the echo estimation filter. The adaptive filtering circuitry has estimation circuitry that receives an ancillary transmission signal transmitted over the transmission path (i.e., disturbing channel) of a neighboring transmission/reception device, in a manner temporally synchronous with the transmission signal. The estimation circuitry can successively determine the n coupling coefficients as a function of the ancillary transmission signal and sum the coefficients successively so as to deliver a coupling signal representative of the estimated coupling between the reception path and the transmission path of the neighboring device. Further, the delay circuitry can deliver a transmission signal that is temporally delayed with respect to the ancillary transmission signal by a delay having a predefined value that is chosen to ensure the convergence of the filtering circuitry. The updating circuitry can update the coupling coefficients of the filtering circuitry on the basis of the temporally delayed transmission signal and the error signal. Additionally, further subtraction circuitry is provided that receives the output of the memory and the output of the filtering circuitry. Thus, the signal emanating from the memory can be ridded of the estimated coupling signal.

In various embodiments, the various circuitry of the coupling estimation block can be embodied in hardware, in software (e.g., within a signal processor), or in a hard-wired manner within an integrated circuit (e.g., for high frequency signals).

According to one embodiment of the device of the present invention, the coupling estimation block includes a main input for receiving the stream of symbols of the ancillary transmission signal (i.e., disturbing channel), an auxiliary input for receiving the error signal, and an output for delivering the estimated coupling signal. The filtering circuitry, the estimation circuitry, and the updating circuitry are distributed over n processing stages connected in series between the main input and the output, and all n processing stages are linked to the auxiliary input.

Further, the stage of rank i includes a first symbol input for receiving a current symbol of the ancillary transmission signal, a second symbol input for receiving a symbol temporally delayed with respect to the current symbol and delivered by the delay circuitry, an updating input for receiving the error signal, a symbol output, a flip-flop connected between the first symbol input and the symbol output for temporarily storing the current symbol, and a secondary output. The stage of rank i also includes S registers for storing S coupling coefficients, and first selection circuitry for selecting one of the registers on the basis of the value of the symbol present at the first symbol input and for delivering the corresponding value of the coupling coefficient.

A first summation circuit sums the selected coupling coefficient with the output of the summation circuit of the stage of rank i−1 in order to deliver the result of the summation to the auxiliary output. The second selection circuitry can selecting, on the basis of the value of the delayed symbol present at the second symbol input, one of the registers and delivering the corresponding value of the coupling coefficient. Then, a second summation circuit sums the coupling coefficient selected by the second selection circuitry with the error signal in order to deliver the result of the summation to the register selected by the second selection circuitry. This updates the selected coupling coefficient.

The secondary output of the last stage delivers the sampled values of the coupling signal and is linked to the second input of the subtraction circuitry, and the first summation circuit of the first stage adds a zero value to the coupling coefficient selected by the first selection circuitry. The adding of the zero value allows an identical hardware structure to be used for all processing stages. Otherwise, the first summation circuit could be omitted from the first processing stage, with the value of the coupling coefficients selected by the first selection circuitry (i.e., output of the first multiplexer) being directly delivered to the input of the first summation circuit of the second processing stage.

In one embodiment of the device of the present invention, the delay circuitry includes elementary delay elements distributed between the various processing stages.

The elementary delay circuitry associated with each processing stage from the first to the next to last include the storage flip-flop of the processing stage and k−1 other storage flip-flops connected in series between the output of the storage flip-flop of the relevant stage and the second symbol input of this stage (i.e., the delayed-symbol input), k being chosen with regard to the predefined value of the delay.

In further embodiments, the coupling estimation block also includes sequencing circuitry for, in tempo with the transmission frequency of the symbols, delivering to the symbol output the successive symbols contained in the flip-flop, and for delivering the successive selected coupling coefficients to the summation circuits. Preferably, the coupling estimation block also includes circuitry for computing a specific symbol representative of an absence of symbol in the ancillary transmission signal (i.e., disturbing channel). Additionally, disabling circuitry is also preferably provided at the output of the computing circuitry and the symbol output of the last processing stage. The disabling circuitry can disable the updating of the coupling coefficients with each delivery of a specific signal by the computing circuitry until the specific symbol has been delivered to the symbol output of the last processing stage.

Figure 1:
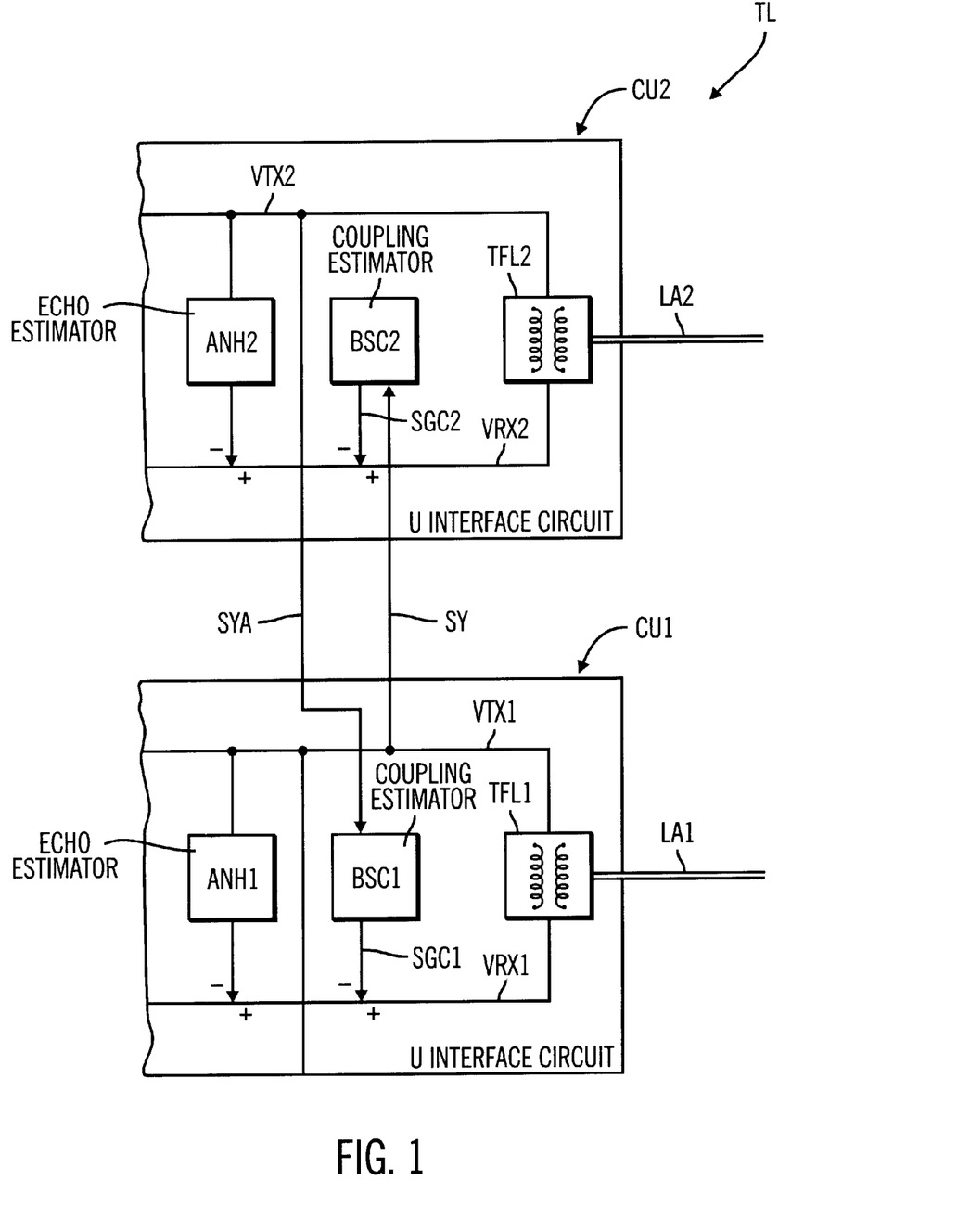
FIG. 1 is a block diagram showing a portion of two U interface circuits according to an embodiment of the present invention.

In FIG. 1, two U interface circuits CU1 and CU2 are connected by two line transformers TFL1 and TFL2 to two subscriber lines LA1 and LA2, respectively. In a conventional manner, the transmission path VTX of each U interface circuit CU conveys symbols that yield a sampled digital signal after passing through a shaping filter. After passing through a digital-to-analog converter and then through a low-pass smoothing filter that eliminates high frequency interference, an analog signal is delivered to the line transformer for transmission over the pair of copper wires that form the telephone line LA. In particular, the analog signal consists of pulses associated with the symbols obtained by coding the digital input information.

Additionally, each interface circuit includes a reception path VRX that is connected to the same line transformer TFL as the transmission path VTX. The signal received on the reception path is sampled by an analog-to-digital converter and then ridded, in a conventional manner, of an echo signal. The echo signal is estimated on the basis of a conventional echo estimation block ANH that is connected between the transmission path VTX and the reception path VRX. The echo estimation block is necessary because the signal transmitted by the interface circuit over the transmission path VTX and the signal to be received are simultaneously present on the pair of telephone wires LA1. The echo cancellation device subtracts the signal to be transmitted from the signal received.

The proximity of the two interface circuits CU1 and CU2, and in particular the proximity of the line transformers TFL1 and TFL2, causes mutual coupling between the two interface circuits during joint transmission and reception. In particular, a disturbance to the reception path of one interface circuit is caused by the transmission path of the other interface circuit. In accordance with the present invention, a coupling estimation block BSC within each interface circuit receives the signal transmitted over the transmission path of the neighboring interface circuit (i.e., the disturbing circuit) and delivers a coupling signal SGC that will be subtracted from the signal on the reception path VRX in order to rid the signal of the estimated coupling signal.

Figure 2:
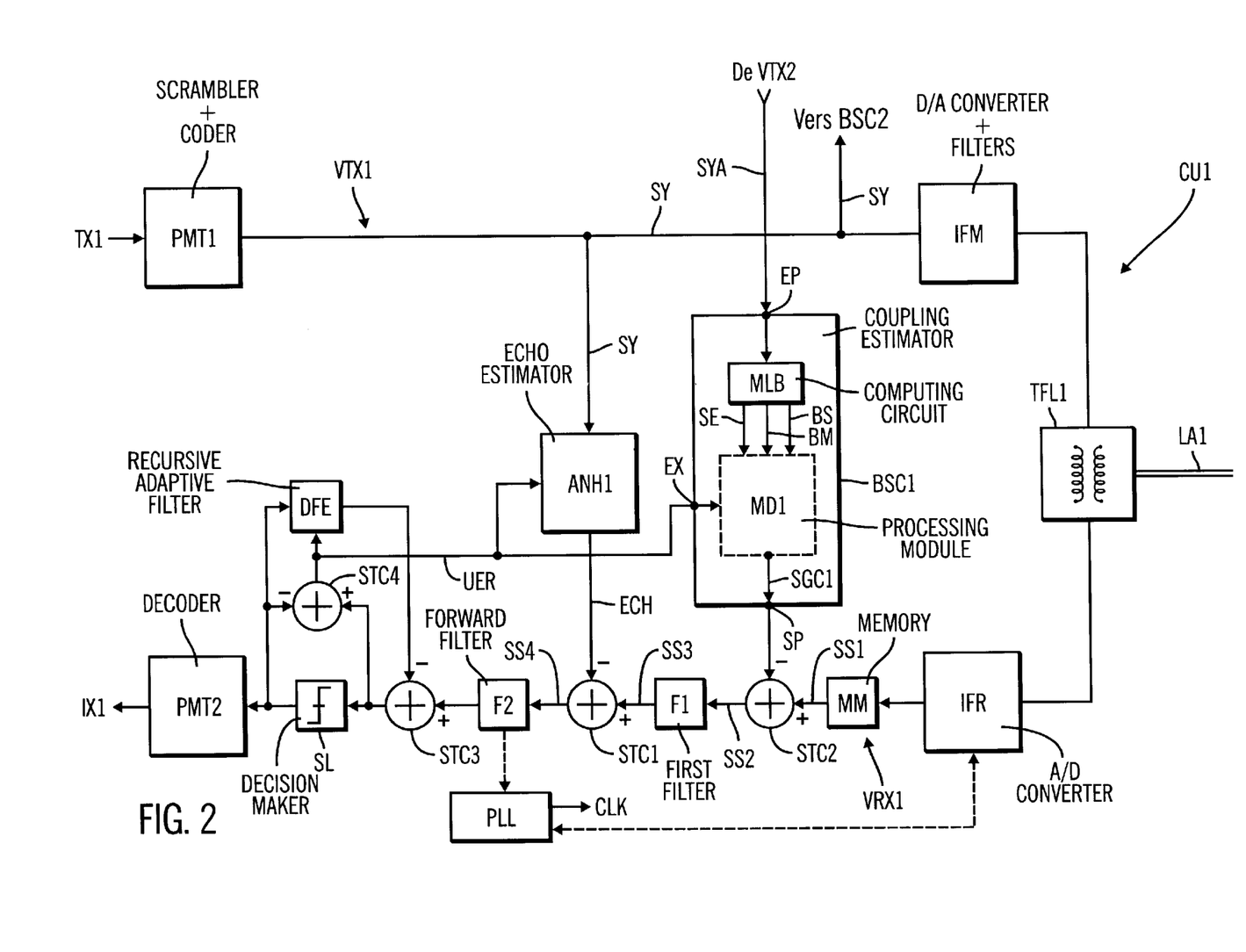
FIG. 2 is a block diagram showing in more detail the architecture of one of the U interface circuits of FIG. 1.

FIG. 2 shows one of the U interface circuits of FIG. 1 in more detail. A stream of digital information TX1, which is typically at a bit rate of 160 Kbits/s, is delivered to a conventional circuit PMT1 formed by a scrambler followed by a 2B1Q or 4B3T coder. The circuit PMT1 outputs a stream of symbols SY on the transmission path VTX1, and the symbols SY are delivered to another conventional circuit IFM having a shaping filter that converts the various received symbols into digital pulses of a sampled digital signal. The circuit IFM also includes a digital-to-analog converter and then a low-pass analog smoothing filter. The corresponding analog signal, which consists of pulses associated with the symbols SY, is then delivered to the line transformer TFL1 for transmission over the subscriber line LA1.

The signal received on the reception path VRX1 is first delivered to a conventional circuit IFR having an analog-to-digital converter that samples the analog signal received at the baud frequency (i.e., the symbol frequency, for example, of 80 KHz for a 2B1Q code). The sampling frequency is provided by the clock signal CLK that is delivered by a conventional phase locked loop PLL. The sampled values are supplied to a FIFO-type memory MM in order to absorb the oscillation (i.e., jitter) of the phase locked loop and compensate for any phase differences between the symbol transmitted at the other end of the subscriber line LA1 and the symbol received at the interface circuit CU1. The size of the memory MM is related to the amplitude of the jitter. In the embodiment of FIG. 2, the size of the memory is illustratively equal to four symbols to allow temporary storage of four digital signal samples.

The delayed signal SS1 output by the memory MM is then ridded of the coupling signal SGC1 that results from disturbance caused by the neighboring interface circuit by subtraction circuit STC2, as will be explained in greater detail below. The resulting signal SS2 is then supplied to a first filter F1 (e.g., a first-order high-pass filter) that shortens the impulse response of the channel in order to ease the work of the echo canceler ANH1. An adaptive identification technique is conventionally used to carry out echo cancellation by subtracting an echo that is estimated on the basis of a model of the acoustic coupling between the transmission and reception paths.

In other words, the estimated echo is determined from the signal SY transmitted on the transmission path VTX1 and from the coupling estimated between the transmission path VTX1 and the reception path VRX1 by an autoadaptive digital transverse filtering. The transverse filter is characterized by a number N of coefficients (e.g., 96 coefficients if it is a single finite impulse response filter, or 64 coefficients of a first finite impulse response filter and 2 coefficients of an infinite impulse response filter). The coefficients of the filter $h_t(i)$, with i varying from 0 to N−1, then represent an impulse response at the instant t whose convolution with the signal SY, represented by samples at the i instants preceding the instant t, forms the estimated echo signal ECH.

The signal SS4, which has been ridded of the echo signal ECH after passing through another subtraction circuit STC1, is delivered to an equalization circuit that reduces the inter-symbol interference and makes the decision regarding the symbol received. More specifically, the equalization circuit includes a forward filter F2 that cancels the precursor coefficient of the impulse response of the subscriber line (channel). The forward filter F2 is conventionally followed by a recursive decision-based equalizer formed by a decision-maker SL and a recursive adaptive filter DFE that is conventionally looped back between the output and the input of the decision-maker SL through another subtraction circuit STC3.

A subtraction circuit STC4, which is connected between the input and the output of the decision-maker SL, outputs an error signal UER that is supplied to the recursive adaptive filter DFE, the echo estimation block ANH1, and an auxiliary input EX of the coupling estimation block BSC1. The equalization circuit is followed by a circuit PMT2 that performs the decoding of the received symbols in order to deliver the stream of received binary information RX1. With the important exception of the coupling estimation block BSC1 and the second subtraction circuit STC2, the circuits described above with respect to FIG. 2 are conventional and entirely known to one of ordinary skill in the art. For example, such circuits are embodied in an interface circuit sold by the Assignee of the present invention under the reference "STLC 5410".

Figure 3:
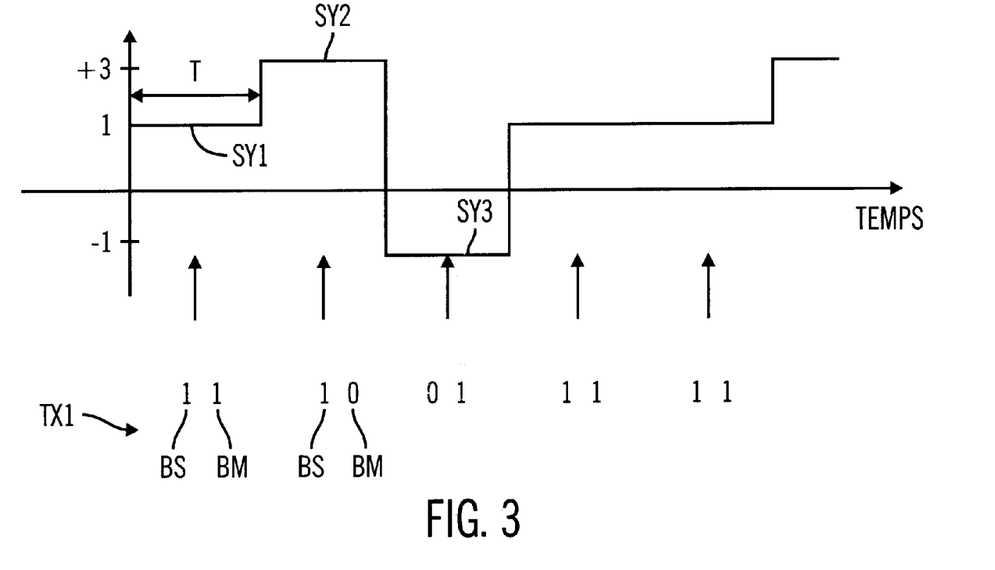
FIG. 3 is a diagram illustrating 2B1Q coding.

Before describing in detail the structure and operation of the coupling estimation block of embodiments of the present invention, the characteristics of the 2B1Q coding that is used for purposes of illustration will be briefly explained. With reference to FIG. 3, the 2B1Q code represents 2 bits of the stream TX1 of binary input information with one of four symbols (or quaternaries)+1,+3,−1, and −3 that are illustrated as SY1, SY2, and SY3, respectively (with the symbol −3 not being represented in FIG. 3). Each pair of bits extracted from the binary information stream includes a first sign bit BS and a second magnitude bit BM. There is a bi-unique correspondence between the values of sign and magnitude bits and the symbols, in accordance with the coding table shown below.

| Sign | Magnitude | Symbol |
|---|---|---|
| 1 | 0 | +3 |
| 1 | 1 | +1 |
| 0 | 1 | −1 |
| 0 | 0 | −3 |

Each symbol SYi of the 2B1Q code has a duration T of 12.5 μs, or in other words the symbols SYi of the 2B1Q code are delivered at a symbol frequency of 80 KHz. Unlike 4B3T coding, when using 2B1Q coding it is not necessary to provide for a specific coder in the circuit PMT1 because straightforward serial-to-parallel conversion circuitry (e.g., in the form of a shift register) can be used by the circuit PMT1 to extract successive pairs of bits from the binary input information stream The coupling estimation block BSC1 of FIG. 2 has a main input EP that receives the symbols SYA transmitted by the transmission path of the neighboring interface circuit CU2. In general, the coupling estimation block BSC1 includes a computing circuit MLB at its head end that allows a digital word (specific symbol) representative of the absence of a symbol to be delivered when no symbol SYA is transmitted over the transmission path VTX2. As explained in detail below, it is important to indicate to the processing stages of the coupling estimation block BSC1 when no disturbing symbol is transmitted by the neighboring interface circuit. Thus, the transmitter of the two U interface circuits transmits a specific signal representative of an absence of transmission such as a specific bit SE having a logic value of 1 to indicate that no symbol is transmitted.

Thus, in the illustrated embodiment that uses 2B1Q coding, the computing circuit MLB can be implemented by a flip-flop having three inputs and outputs for the specific bit SE indicating presence or absence of a disturbing symbol SYA, and the sign and magnitude bits BS and BM of symbols SYA transmitted over the disturbing channel. The three bits SE, BM, and BS are transmitted to a processing module MD1 that also has an auxiliary input EX for receiving the error signal UER. The processing module MD1, which is shown in more detail in FIG. 4, outputs the estimated coupling signal SGC1. The output SP of the coupling estimation block BSC1 is supplied to the subtraction circuit STC2 in order to rid the signal SS1 of the estimated coupling signal.

Figure 4:
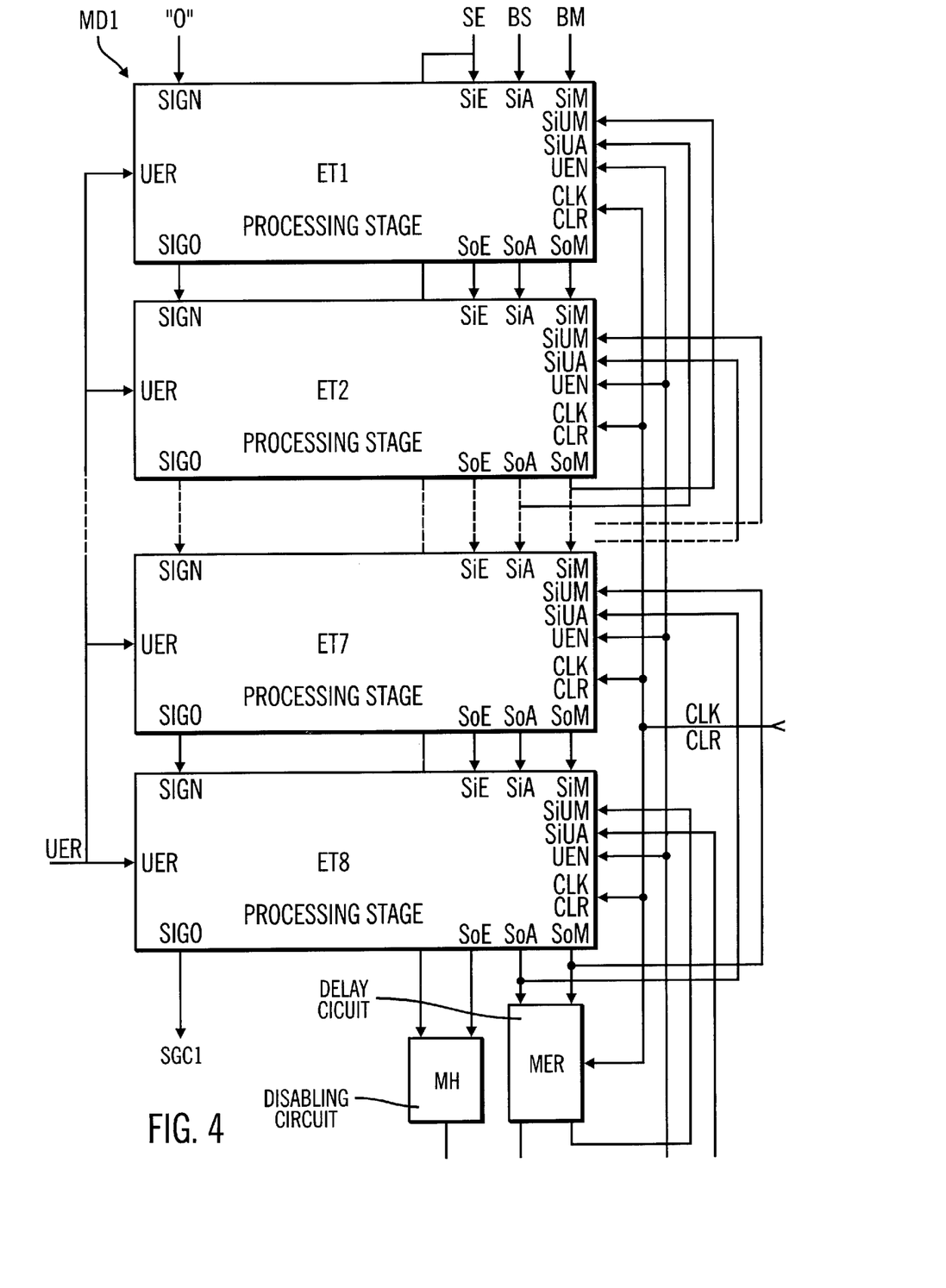
FIG. 4 is a block diagram showing in more detail a portion of the coupling estimation block of the U interface circuit of FIG. 2.

As shown in FIG. 4, the module MD1 of the coupling estimation block BSC1 has n successive processing stages (n=8 in the illustrated embodiment). Each processing stage includes a first symbol input SiE, SiA, and SiM that receives the three bits SE, BS, and BM, and a second symbol input SiUA and SiUM that receives the sign bits and magnitude bits of a symbol that is delayed with respect to the symbol received at the first symbol input. Further, the current processing stage includes a symbol output SoE, SoA, and SoM that supplies the symbol received by this current stage to the first symbol input of the next stage.

Additionally, an updating input UER of each stage is receives the error signal UER from the auxiliary input EX. Each processing stage also has a secondary input SIGN and a secondary output SIG0 that is connected to the secondary input of the next stage. The secondary output SIG0 of the last processing stage ET8 delivers the estimated coupling signal SGC1, and the secondary input SIGN of the first processing stage ET1 illustratively receives a zero value.

Further, each processing stage includes a disabling input UEN that receives a disabling signal UEN (as will be explained below), and another input that receives the sequencing clock signal CLK and a reset-to-zero signal CLR.

The symbol temporally delayed with respect to the current symbol received by the current processing stage is obtained by looping back the ports SoA and SoM of the symbol output of a stage of higher rank to the delayed-symbol input SiUA and SiUM of the current stage. The number of processing stages looped back in this manner depends on the number of delays induced into the calculation and propagation of the error signal UER. This number, which is equivalent to a delay in the series of symbols, must be chosen such that the coherence between the symbol entering via the ports SiUA, SiUM and the error UER is a maximum in order to ensure the convergence of adaptation.

To preserve the same delay for the last stages, extra delay circuitry MER is added. In the illustrated embodiment with an exemplary delay value k of 2 (as explained below), the extra delay circuit MER allows the ports SoA and SoM of the symbol output of stage ET8 to loop back to the delayed-symbol input SiUA and SiUM of the same stage ET8. A disabling circuit MH (described below) receives the specific bit SE and the output of the port SoE of the symbol output of the last processing stage, and outputs the disabling signal UEN.

Figure 5:
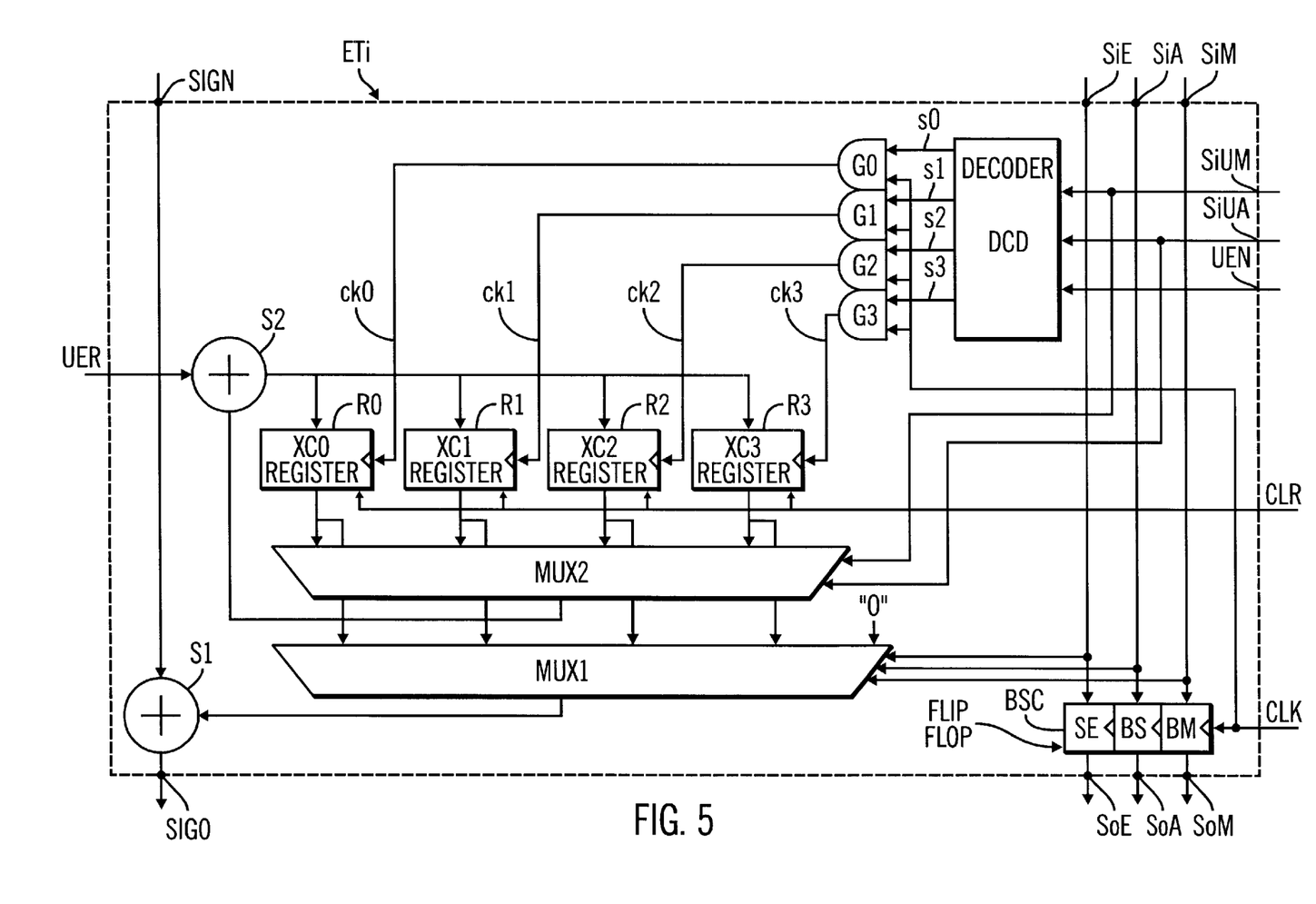
FIG. 5 is a block diagram showing in more detail the internal architecture of one of the processing stages of the module of FIG. 4.

FIG. 5 shows more detail of one of the processing stages of the module of FIG. 4. As shown, the processing stage ETi of rank 1<i<n includes a storage flip-flop BSC that is controlled by the clock signal CLK and connected between the symbol input SiE, SiA, and SiM and the symbol output SoE, SoA, and SoM. Thus, the flip-flop BSC temporarily stores each current symbol received by the stage or the specific symbol indicating absence of transmission over the disturbing channel. Additionally, the processing stage ETi includes four registers R0–R3 that respectively store four coupling coefficients XC0–XC3 associated with the four possible values of the transmission symbols of the 2B1Q code.

The four registers are respectively controlled by four elementary clock signals ck0–ck3 that are delivered by four AND gates G0–G3. Each AND gate Gj receives the clock signal CLK and a decoding signal sj from a conventional decoder DCD, which receives the two bits of the delayed symbol SiUA and SiUM and the disabling signal UEN. The four registers can be reset to zero by the reset-to-zero signal CLR (e.g., on system start-up). The outputs of the four registers are supplied to four inputs of a multiplexer MUX1 that forms a first selection circuit controlled by the three bits SE, BS, and BM received at the symbol input. The multiplexer MUX1 also has a fifth input that always receives a zero value.

The output of the first multiplexer MUX1 is supplied to the first input of a first summation circuit S1. The first summation circuit S1 also receives the secondary input SIGN of the current stage ETi, and the output of the first summation circuit is supplied to the secondary output SIG0 of the stage. The four outputs of the four registers R0–R3 are also supplied to the four inputs of a second multiplexer MUX2 that is controlled by the values of the sign and magnitude bits of the delayed symbol delivered at the second symbol input SiUA and SiUM. The output of the second multiplexer MUX2 is supplied to a second summation circuit S2 that also receives the error signal UER. The output of the second summation circuit is supplied to the four inputs of the four registers R0–R3.

The operation of the coupling estimation block will now be explained. It is initially assumed that the neighboring interface circuit CU2 transmits a continuous stream of symbols SYA so that the bit SE is zero for each symbol of the stream. Therefore, each of the symbols of the stream transmitted by the interface circuit CU2 is successively propagated through each of the n processing stages by way of the various flip-flops BSC in tempo with the rising edges of the clock signal CLK (i.e., in tempo with the transmission frequency of the symbols). Within the current processing stage of rank i, the multiplexer MUX1 selects the coupling coefficient XC stored in the register R corresponding to the value of the current symbol received at the first input and determined by the value of the sign and magnitude bits BS and BM.

The selected coupling coefficient is then summed with the output of the summation circuit S1 of the previous stage, and the result is delivered to the next stage. Therefore, the various samples of the coupling signal SGC1 are obtained via a sum of n coupling coefficients whose values depend on the n transmission symbols that have been successively received by the n processing stages. Moreover, the updating of the coupling coefficients is performed on the basis of the value of the symbol delayed with respect to this symbol and present at the second symbol input SiUM and SiUA, not the value of the symbol received at the first symbol input.

More specifically, depending on the value of the sign and magnitude bits of the delayed symbol, the decoding circuit DCD and the set of corresponding logic gates Gj deliver the corresponding clock signal ckj to the register R corresponding to the value of the delayed symbol. The current value of the corresponding coupling coefficient is then output by the selected register. Moreover, the values of the sign and magnitude bits of the delayed symbol allow the second multiplexer MUX2 to be controlled in an analogous manner so as to supply the output of the selected register to the output of the multiplexer second MUX2 and thus the first input of the summation circuit S2.

Thus, the sampled value UER of the error signal is added to the current value of the selected coupling coefficient to give a sum yielding a new value of the coupling coefficient that is again stored in the same register. The number k of symbol periods separating the delayed symbol from the current symbol (i.e., the value of the delay for updating the coupling coefficients) is chosen so as to ensure the convergence of the various estimation algorithms, and in particular the convergence of the algorithm for estimating the coupling signal. The value of k depends on the structure of the reception path of the interface circuit and generally on the propagation time between the subtractor STC2 and the subtractor STC4.

An a priori value of the delay k can be determined as a function of the number of filters present on the reception path between these two subtractors. Then, a simulation makes it possible to adopt this value of the delay k. Thus, for a structure of the type illustrated in FIG. 2, a FIFO size of 4, and a number n of coupling coefficients equal to 8, a value of the delay k equal to 5 allows the sought-after convergence to be obtained. In the module shown in FIG. 4, given the presence of a flip-flop BSC within each processing stage, the value k has been made equal to 2 for the sake of simplicity.

When no symbol is transmitted on the transmission path of the disturbing interface circuit, the value of the bit SE is equal to 1. In such a case, it is appropriate to assign a zero coupling coefficient because the absence of a symbol does not engender any disturbance on the reception path of the interface circuit CU1. When the bit SE is 1, the multiplexer MUX1 supplies the fifth input (i.e., a zero value) to the output to sum a zero value in the summation circuit S1. Additionally, the updating of the coupling coefficients in the registers R0–R3 is disabled during a period of absence of transmission on the transmission path of the disturbing interface circuit, as illustrated in the diagram of FIG. 6.

Figure 6:
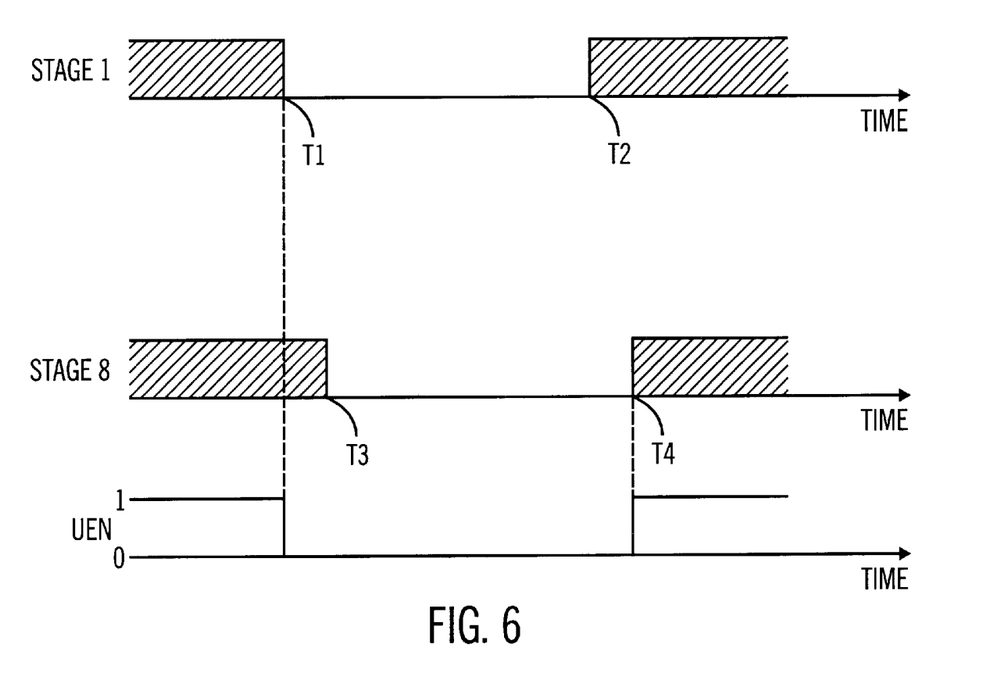
FIG. 6 is a diagram illustrating the operation of the coupling coefficient update disabling circuitry.

In the diagram of FIG. 6, it is assumed that no symbol transmission occurs on the transmission path of the disturbing interface circuit CU2 during the period of TI–T2. Given the propagation in tempo with the symbol frequency, the period T1–T2 translates in the n processing stages into a period T3–T4 at the output of the eighth processing stage. Before time T1, the disabling signal UEN was equal to 1 in order to permit the updating of the coupling coefficients. At time T1, the disabling circuit MH detects the rising of the bit SE to 1 and causing the logic signal UEN to change to the zero state in order to prohibit the updating of the registers R0–R3 (i.e., their values remain frozen because the clock signals ck0–ck3 are not supplied). Such disabling of the updating remains in effect until time T4, and at time T4 the signal UEN rises back to 1.

In the device of FIG. 2, the subtractor STC2 is located upstream of the subtractor STC1. However, it is also possible to locate the subtractor STC2 downstream of the subtractor STC1, which would cause the value of the delay k for updating the coupling coefficients to be reduced. By first subtracting the coupling signal and then subtracting the echo signal, it is possible to construct the circuit IFR, the memory MM, and the block BSC1 on a separate component and then easily connect the resulting assembly to another component (e.g., an already-existing component that includes the other elements of the interface circuit).

While the embodiments of the present invention described above relate to the 2B1Q code, any transmission code can be used with the present invention regardless of the number of symbols in the code by adapting the various circuitry described above and in particular the number of registers R0–R3 and the number of inputs/outputs of the computing circuit MLB and the storage flip-flops. Furthermore, in systems in which several interface circuits disturb an interface circuit, the coupling estimation block of the embodiments described above can be duplicated as many times as necessary. In this respect, the additional coupling estimation blocks are coupled to the respective transmission paths of the other disturbing circuits, and all coupling estimation blocks are coupled to the subtractor STC2.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, embodiments of the present invention may not include all of the features described above. Therefore, it is intended that the present invention not be limited to the particular embodiments disclosed, but that the invention include all embodiments falling within the scope of the appended claims.

What is claimed is:

1. A method for reducing disturbing effects of coupling between a first transmission/reception device and a second transmission/reception device, each of the first and second devices being connected to a subscriber line that conveys streams of symbols in a temporally synchronous manner, each of the symbols being transmitted for a predetermined transmission period, said method comprising the steps of:

delaying a signal received on a reception path of the first device by a delay equal to p times the transmission period;

estimating a coupling signal relating to a transmission path of a second device and the reception path of the first device based on a signal transmitted over the transmission path of the second device; and ridding the delayed signal of the estimated coupling signal, wherein the estimating step includes the sub-step of estimating the coupling signal based on successive sums of n coefficients of a coupling estimation adaptive filter that are determined based on the signal transmitted over the transmission path of the second device, and n is greater than or equal to p.

2. The method as defined in claim 1, further comprising the step of updating the coefficients of the coupling estimation filter based on an error signal and a signal that is temporally delayed with respect to the signal transmitted over the transmission path of the second device by a delay having a predetermined value that is chosen so as to ensure convergence of the estimation of the coupling signal.

3. The method as defined in claim 1, further comprising the steps of:

estimating an echo signal based on the signal transmitted over the transmission path of the first device; and ridding the delayed signal of the echo signal.

4. The method as defined in claim 3, wherein n is less than or equal to an eighth of the number of coefficients used to perform the echo estimation.

5. The method as defined in claim 3, wherein the step of ridding the delayed signal of the estimated coupling signal is performed before the step of ridding the delayed signal of the echo signal.

6. A method for reducing disturbing effects of coupling between a first transmission/reception device and a second transmission/reception device, each of the first and second devices being connected to a subscriber line that conveys streams of symbols in a temporally synchronous manner, each of the symbols being transmitted for a predetermined transmission period, said method comprising the steps of:

delaying a signal received on a reception path of the first device by a delay equal to p times the transmission period;

estimating a coupling signal relating to a transmission path of a second device and the reception path of the first device based on a signal transmitted over the transmission path of the second device; and ridding the delayed signal of the estimated coupling signal, wherein for a continuous stream of symbols transmitted over the transmission path of the second device, the estimating step includes the sub-steps of:

determining a coupling coefficient for each symbol transmitted over the transmission path of the second device by choosing one of the coupling coefficients of a coupling group associated with the symbol transmitted, the coupling group being composed of S coupling coefficients that are associated with S possible values for the symbol transmitted; and estimating the coupling signal by successive sums of n coupling coefficients that are associated with n consecutive symbols of the stream, the n coupling coefficients being chosen from n coupling groups.

7. The method as defined in claim 6, wherein the estimating step also includes the sub-step of:

updating the coupling coefficients by updating the coupling group associated with the symbol of rank i by updating the coupling coefficient associated with the value of the symbol of rank i-k based on the previous value of the symbol of rank i-k and an error signal, wherein k is a predetermined value that is chosen so as to ensure convergence of the estimation of the coupling signal.

8. The method as defined in claim 7, wherein in the absence of a symbol transmitted over the transmission path of the second device, a specific symbol representative of the absence of a transmitted symbol is derived and a zero coupling coefficient is assigned to the specific symbol.

9. The method as defined in claim 8, wherein for a discontinuous stream of symbols transmitted over the transmission path of the second device, the estimating step includes the sub-steps of:

estimating the coupling signal by successive sums of n coupling coefficients that include the coupling coefficients associated with the symbols of the stream and chosen from the corresponding coupling groups and the zero coupling coefficients corresponding to the absences of transmitted symbols; and refraining from updating the n coupling groups for each presence of a specific symbol and for a duration equal to n times the transmission period.

10. The method as defined in claim 9, wherein the estimating step includes the sub-step of:

estimating the coupling signal by calculating, at the transmission frequency, coupling signal samples by n successive elementary processing operations performed in tempo with the transmission frequency, wherein in each elementary processing operation, one of the symbols of the stream of symbols transmitted over the transmission path of the second device or the specific symbol, a symbol temporally delayed with respect to the one symbol or the specific symbol, and a sampled value of the error signal are received, the coupling coefficient associated with the one symbol or with the specific symbol is determined by summing with the result of a counterpart summation that is performed at the previous processing operation, and, when updating of the coupling coefficients is permitted, the coupling coefficient associated with the delayed symbol is updated by summing the previous value of the coupling coefficient with the sampled value of the error signal.

11. A device for transmitting/receiving a signal, said device comprising:

a transmission path connected to a subscriber line for transmitting a transmission signal that includes streams of digital symbols;

a reception path connected to the subscriber line for receiving a reception signal that includes streams of digital symbols;

a memory coupled to the reception path for temporarily storing p symbols;

a coupling estimation block coupled to the reception path, the coupling estimation block including:

an adaptive filter with n coupling coefficients, n being greater than or equal to p; and an estimation circuit receiving an ancillary transmission signal that is transmitted over a transmission path of another transmission/reception device in a manner temporally synchronous with the transmission of the transmission signal, wherein the estimation circuit and adaptive filter successively determining the n coupling coefficients as a function of the ancillary transmission signal and summing the coupling coefficients successively so as to deliver a coupling signal that is representative of estimated coupling between the reception path and the transmission path of the other device; and a first subtraction circuit having one input coupled to an output of the memory and another input coupled to an output of the coupling estimation block.

12. The device as defined in claim 11, further comprising:

an echo estimation block coupled between the transmission path and the reception path, the echo estimation block including a finite impulse response adaptive filter that receives the transmission signal and an error signal derived from the reception path; and a second subtraction circuit having one input coupled to an output of the memory and another input coupled to an output of the echo estimation block.

13. The device as defined in claim 12, wherein n is less than or equal to an eighth of the number of coefficients of the echo estimation block.

14. The device as defined in claim 12, wherein the second subtraction circuit is coupled between the memory and the first subtraction circuit.

15. The device as defined in claim 12, wherein the coupling estimation block also includes:

a delay circuit delivering a temporally delayed transmission signal, the delayed transmission signal being delayed with respect to the ancillary transmission signal by a predetermined delay that is chosen so as to ensure convergence of the adaptive filter; and an updating circuit for updating the coupling coefficients of the adaptive filter based on the delayed transmission signal and the error signal.

16. The device as defined in claim 15, wherein the coupling estimation block receives the stream of symbols of the ancillary transmission signal and the error signal, and outputs the coupling signal, and the adaptive filter, the estimation circuit, and the updating circuit are distributed over n processing stages that are connected in series.

17. The device as defined in claim 16, wherein the stage of rank i includes a first symbol input for receiving a current symbol of the ancillary transmission signal, a second symbol input for receiving a symbol that is temporally delayed with respect to the current symbol, an updating input for receiving the error signal, a symbol output, a flip-flop connected between the first symbol input and the symbol output for temporarily storing the current symbol, a secondary output, S registers for storing S coupling coefficients, a first selection circuit for selecting one of the registers based on the symbol at the first symbol input and delivering the corresponding value of the coupling coefficient, a first summation circuit for summing the selected coupling coefficient with the output of a first summation circuit of the stage of rank i−1 and delivering the result to the secondary output, a second selection circuit for selecting one of the registers based on the delayed symbol at the second symbol input and delivering the corresponding value of the coupling coefficient, a second summation circuit for summing the coupling coefficient selected by the second selection circuit with the error signal and delivering the result to the register selected by the second selection circuit.

18. The device as defined in claim 17, wherein the secondary output of the last stage is coupled to the first subtraction circuit, and the first summation circuit of the first stage adds a zero to the coupling coefficient selected by the first selection circuit.

19. The device as defined in claim 18, wherein the coupling estimation block includes a sequencing circuit for delivering to the symbol output the successive symbols contained in the flip-flop in tempo with the transmission frequency of the symbols, and for delivering the successive selected coupling coefficients to the summation circuits.

20. The device as defined in claim 19,
wherein the delay circuit includes elementary delay means distributed between the various processing stages,
and the elementary delay means associated with each processing stage from the first to the next to last includes the flip-flop of the processing stage and k−1other flip-flops connected in series between the output of the flip-flop and the second input of the relevant stage, k being chosen with regard to the predetermined delay.

21. The device as defined in claim 19, wherein the coupling estimation block also includes:
a computing circuit for computing a specific symbol representative of an absence of symbol in the ancillary transmission signal; and
a disabling circuit connected to the computing means and the symbol output of the last processing stage for disabling updating of the coupling coefficients when a specific signal is output by the computing means until the specific symbol has been delivered to the symbol output of the last processing stage.

22. An information handling system including at least one device for transmitting/receiving a signal, said device comprising:
a transmission path connected to a subscriber line for transmitting a transmission signal that includes streams of digital symbols;
a reception path connected to the subscriber line for receiving a reception signal that includes streams of digital symbols;
a memory coupled to the reception path for temporarily storing p symbols;
a coupling estimation block coupled to the reception path, the coupling estimation block including:
an adaptive filter with n coupling coefficients, n being greater than or equal to p; and
an estimation circuit receiving an ancillary transmission signal that is transmitted over a transmission path of another transmission/reception device in a manner temporally synchronous with the transmission of the transmission signal,
wherein the estimation circuit and adaptive filter successively determining the n coupling coefficients as a function of the ancillary transmission signal and summing the coupling coefficients successively so as to deliver a coupling signal that is representative of estimated coupling between the reception path and the transmission path of the other device; and
a first subtraction circuit having one input coupled to an output of the memory and another input coupled to an output of the coupling estimation block.

23. The information handling system as defined in claim 22, wherein said device further comprises:
an echo estimation block coupled between the transmission path and the reception path, the echo estimation block including a finite impulse response adaptive filter that receives the transmission signal and an error signal derived from the reception path; and
a second subtraction circuit having one input coupled to an output of the memory and another input coupled to an output of the echo estimation block.

24. The information handling system as defined in claim 23, wherein n is less than or equal to an eighth of the number of coefficients of the echo estimation block.

25. The information handling system as defined in claim 23, wherein the second subtraction circuit is coupled between the memory and the first subtraction circuit.

26. The information handling system as defined in claim 23, wherein the coupling estimation block also includes:
a delay circuit delivering a temporally delayed transmission signal, the delayed transmission signal being delayed with respect to the ancillary transmission signal by a predetermined delay that is chosen so as to ensure convergence of the adaptive filter; and
an updating circuit for updating the coupling coefficients of the adaptive filter based on the delayed transmission signal and the error signal.

* * * * *

UNITED STATES PATENT AND TRADEMARK OFFICE
CERTIFICATE OF CORRECTION

PATENT NO. : 6,452,967 B1
DATED : September 17, 2002
INVENTOR(S) : Francois Druilhe It is certified that error appears in the above-identified patent and that said Letters Patent is hereby corrected as shown below:

Title page,
Item [57], ABSTRACT,
Line 16, change "$(n > p)$" to -- $(n \geq p)$ --.

Column 2,
Line 64, change "$(n > p)$" to -- $(n \geq p)$ --.

Column 11,
Line 30, change "$1 < i < n$" to -- $1 \leq i \leq n$ --.

Signed and Sealed this

Twenty-eighth Day of January, 2003

JAMES E. ROGAN
*Director of the United States Patent and Trademark Office*